US008854825B2

(12) United States Patent
Yamazaki

(10) Patent No.: US 8,854,825 B2
(45) Date of Patent: Oct. 7, 2014

(54) TERMINAL BOX, OUTPUT CABLE CONNECTION ARRANGEMENT FOR SOLAR CELL MODULE TERMINAL BOX AND FIXATION ARRANGEMENT FOR THE OUTPUT CABLE

(75) Inventor: Masakazu Yamazaki, Yao (JP)

(73) Assignee: Hosiden Corporation, Osaka (JP)

( * ) Notice: Subject to any disclaimer, the term of this patent is extended or adjusted under 35 U.S.C. 154(b) by 432 days.

(21) Appl. No.: 13/239,690

(22) Filed: Sep. 22, 2011

(65) Prior Publication Data
US 2012/0075825 A1 Mar. 29, 2012

(30) Foreign Application Priority Data

Sep. 29, 2010 (JP) ................................. 2010-219971
Sep. 29, 2010 (JP) ................................. 2010-219972
Sep. 29, 2010 (JP) ................................. 2010-219973

(51) Int. Cl.
*H05K 5/00* (2006.01)

(52) U.S. Cl.
USPC ........................................................ 361/730

(58) Field of Classification Search
USPC ........................................................ 361/730
See application file for complete search history.

(56) References Cited

U.S. PATENT DOCUMENTS

| 8,432,699 B2* | 4/2013 | Chou et al. ................... 361/730 |
| 8,520,397 B2* | 8/2013 | Azumi et al. ................ 361/752 |
| 8,563,876 B1* | 10/2013 | Gretz .......................... 174/559 |
| 2005/0054244 A1 | 3/2005 | Werner et al. |
| 2005/0224110 A1 | 10/2005 | Yoshikawa et al. |
| 2008/0236886 A1* | 10/2008 | Gerull et al. ................. 174/535 |
| 2008/0278898 A1* | 11/2008 | Huang .......................... 361/683 |
| 2008/0304200 A1* | 12/2008 | Hotchkiss et al. ............ 361/111 |
| 2010/0294529 A1 | 11/2010 | Nunokawa |
| 2011/0108085 A1 | 5/2011 | Quiter |

FOREIGN PATENT DOCUMENTS

| DE | 20311183 U1 | 7/2004 |
| EP | 1587149 A2 | 10/2005 |
| JP | 20028793 A | 1/2002 |
| JP | 200276412 A | 3/2002 |
| JP | 2002141537 A | 5/2002 |
| JP | 2004152548 A | 5/2004 |
| JP | 2005209971 A | 8/2005 |
| JP | 2009252879 A | 10/2009 |
| JP | 4452997 B2 | 4/2010 |
| JP | 2010118394 A | 5/2010 |
| WO | 2009135691 A1 | 11/2009 |

* cited by examiner

*Primary Examiner* — Forrest M Phillips
(74) *Attorney, Agent, or Firm* — The Webb Law Firm

(57) ABSTRACT

A terminal box is provided having a terminal plate body and a fixed attachment portion to which at least one lead terminal portion of the diode is fixed, and the fixed attachment portion is connected to the terminal plate body via a displacement-allowing connecting portion. An output cable connection arrangement for a solar cell module terminal box is further provided in which an output cable is inserted to a cable insertion portion such that an inner coating portion coating a core wire of the output cable and an outer coating portion coating the inner coating portion are engaged within the cable insertion portion. An output cable fixation arrangement for a solar cell module terminal box is further provided in which an output cable is fixed to the terminal box by means of a cable fastener having a first fixing portion to be fixed to a barrel portion of the output cable.

10 Claims, 14 Drawing Sheets

TERMINAL BOX, OUTPUT CABLE CONNECTION ARRANGEMENT FOR SOLAR CELL MODULE TERMINAL BOX AND FIXATION ARRANGEMENT FOR THE OUTPUT CABLE

TECHNICAL FIELD

The present invention relates to a terminal box including a box body attachable to an attachment target, a plurality of terminal plates juxtaposed under a mutually isolated state inside the box body, and a diode conductively connected to and between adjacent terminal plates.

The invention relates also to an output cable connection arrangement for a solar cell module terminal box for electrically connecting an output cable to a terminal plate provided inside the terminal box to be electrically connected to a solar cell module through a cable insertion portion provided in the terminal box from the outside of the terminal box. The invention further relates to a fixation arrangement for the output cable.

BACKGROUND ART (Terminal Box)

Conventionally, with the terminal box of this type, a plurality of terminal plates formed respectively of a rectangular metal terminal plate body are fixed in spaced relationship inside a box body formed of a synthetic resin and a diode arranged between adjacent terminal plates has its lead terminal portion rigidly attached by means of soldering to a portion of to surface of the terminal plate body (see e.g. Patent Document 1).

That is, the terminal plates and the diode are rigidly unified.

Further, after the diode is conductively connected to the terminal plates, sometimes, sealing of the space of the box body is sometimes effected with charging of a sealing material such as silicone.

With the above-described conventional terminal box, in case this box is used for an attachment target subjected to severe temperature environment such as a solar cell module, the terminal box per se is also subjected to violent change of the ambient temperature.

As described above, the terminal box comprises an assembly of materials having differing characteristics (especially, thermal expansion coefficients) for forming the terminal plate body, the diode, the sealing material, etc. Therefore, there is the risk of these materials being subjected repeatedly to thermal deformations at different ratios (thermal expansion and thermal contraction) in association with changes in the ambient temperature.

As a result, small differences among the thermal deformation amounts of the respective materials are applied repeatedly as a concentrated load to the connecting portions between the diode and the terminal plate body, so that a connection failure may occur. Hence, there was a problem of likelihood of connection failure in the case of significant difference in the ambient temperature.

(Connection Arrangement for Output Cable)

A solar power generation system is configured to generate and supply power with a plurality of solar cell modules disposed in a matrix pattern on e.g. a roof of a building. In order to obtain a desired voltage, each solar cell module is connected in series or in parallel with an adjacently disposed solar cell module. In order to provide a protection for a connecting portion in electrically interconnecting the electrodes of the solar cell modules, a terminal box is attached to the rear face of the solar cell module.

Inside this terminal box, there are provided a plurality of terminal plates to be electrically connected to output terminals of the solar cell modules. Each terminal plate is electrically connected to one end of an output cable for external connection.

For instance, in the case of a solar cell module disclosed in Patent Document 2, over the output cable, there is fitted a waterproof sleeve for securing this output cable to a cable insertion portion. As this waterproof sleeve is provided between the cable insertion portion and the output cable, intrusion of water can be prevented.

In the solar cell module described in Patent Document 2, the waterproof sleeve used for fixing the output cable to the cable insertion portion is disposed in such a manner as to surround the outer coating portion of this output cable. As this outer coating portion tends to be become brittle due to aging degradation as a result of its direct exposure to an outside environment such as ultraviolet rays, a crack may develop therein or its outer shape may be changed or deformed due to frictional wear. If such problem occurs at the contact portion between the outer coating portion and the waterproof sleeve, this may lead to formation of a gap between the outer coating portion and the waterproof sleeve, thus leading to deterioration in the water proof performance of this waterproof sleeve.

(Fixation Arrangement for Output Cable)

Conventionally, in a fixation arrangement for an output cable of a solar cell module terminal box, separately from the electric connection to the terminal plate, there would be provided a cable fastener for fasting or fixing the output cable to the terminal box. This cable fastener is comprised of a cable pressing member and the cable fastener prevents floating detachment of the output cable through its surface contact with the output cable. This cable pressing member is retained and fixed to the terminal box (see e.g. Patent Document 3).

However, looseness tends to develop in the surface contact of the cable pressing member to the output cable. For this reason, if a continued load is applied to the output cable from the outside, this will cause displacement of the output cable relative to the terminal box, thus impairing the electric connection to the terminal plate.

PRIOR ART DOCUMENTS

Patent Documents

[Patent Document 1] Japanese Unexamined Patent Application Publication No. 2005-209971
[Patent Document 2] Japanese Unexamined Patent Application Publication No. 2010-118394
[Patent Document 3] Japanese Patent No. 4452997

SUMMARY OF THE INVENTION

Object to be Achieved by Invention

The first object of the present invention is to provide a terminal box which can effectively resist occurrence of connection failure even when there is a significant temperature difference in the environment where the box is installed.

The second object of the present invention is to provide a connection arrangement for an output cable of a solar cell module terminal box, which connection arrangement is capable of reliably maintaining its initial waterproof performance.

The third object of the present invention is to provide a fixation arrangement for an output cable of a solar cell module terminal box, which fixation arrangement is capable of effectively resisting impairment of electric connection between the output cable and the terminal plate.

Means for Achieving the Objects

[1] Terminal Box

According to a first characterizing feature of an inventive terminal box for achieving the above-described first object, the terminal box comprises:

a box body attachable to an attachment target;

a plurality of terminal plates juxtaposed under a mutually isolated state inside the box body; and a diode conductively connected to and between adjacent terminal plates;

wherein each one of said terminal plates includes a terminal plate body and a fixed attachment portion to which at least one lead terminal portion of said diode is fixed, said fixed attachment portion being connected to said terminal plate body via a displacement-allowing connecting portion that can be displaced relative to said terminal plate body.

With the above-described arrangement, as the fixed attachment portion is connected to the terminal plate body via a displacement-allowing connecting portion, displacement of this fixed attachment portion relative to the terminal plate body is allowed. This arrangement allows such displacement, with keeping the connection between the diode having its lead terminal portion fixedly attached to the fixed attachment portion and the terminal plate body. For instance, even if forces along different directions are applied respectively to the diode and the terminal plate due to a temperature difference of the ambient temperature, these forces can be absorbed by the displacement-allowing connecting portion, so that connection failure therebetween can be avoided. Therefore, even in the case of violent temperature difference in the ambience, connection failure will hardly occur. This advantageous function/effect can be achieved, with attachment of any diode to be attached, regardless of its type or difference of its structure.

Incidentally, the displacement-allowing connecting portion can be an arrangement of smaller width (or the thickness or both the width and the thickness) than the terminal plate body or the fixed attachment portion or an arrangement of using a material which can be deformed more easily than the other portion.

According to a second characterizing feature of the inventive terminal box, said terminal plate is formed of a metal plate, and said displacement-allowing connecting portion is formed of a bridge portion having a smaller width than the terminal plate body and the fixed attachment portion.

With the above-described arrangement, if the displacement-allowing connecting portion is provided as a component having a smaller width than the terminal plate body and the fixed attachment portion, this arrangement is advantageous in that it requires less machining trouble and is economical than the arrangement of forming the bridge portion of a material that can be deformed more easily than the other portion.

Further, the bridge portion can be a portion which linearly interconnects between the terminal plate body and the fixed attachment portion, or it can be freely designed such as a bridge portion comprising a curved portion or combination of a curved portion and a straight portion.

According to a third characterizing feature of the inventive terminal box, said bridge portion includes a curved portion which is bent in the thickness direction.

With this construction, due to the curved portion, the bridge portion can be readily displaced in the thickness direction as well. Therefore, it becomes possible to allow the displacement between the fixed attachment portion and the terminal plate body in any desired direction, such as the width direction, the thickness direction and the length direction of the bridge portion. Hence, even higher displacement allowing effect can be achieved.

[2] Connection Construction for Output Cable

In the inventive connection arrangement for an output cable of a solar cell module terminal box for achieving the second object, an output cable connection arrangement for a solar cell module terminal box for electrically connecting an output cable to a terminal plate provided inside the terminal box to be electrically connected to a solar cell module through a cable insertion portion provided in the terminal box from the outside of the terminal box, according to the first characterizing feature thereof, said output cable is inserted to said cable insertion portion such that a waterproof portion which covers an outer peripheral face and an end face of a leading end of an inner coating portion coating a core wire of said output cable and an outer coating portion coating said inner coating portion adjacent the waterproof portion are engaged within said cable insertion portion.

As the output cable, there is widely employed a cable configured such that its core wire is coated by the inner coating portion and this inner coating portion is coated by the outer coating portion. With the outer coating portion, depending on the material constituting it, there is a risk of developing a crack therein or change in its outer shape, due to aging degradation, which would be a cause for deterioration in the waterproof performance. According to the present invention, the waterproof portion, instead of the outer coating portion, surrounds the outer peripheral face of the leading end of the inner coating portion. The inner coating portion, as being surrounded by the waterproof portion and the outer coating portion, is not directly exposed to the outside environment. Therefore, crack or change of its outer shape due to aging degradation will hardly occur, such that a gap will hardly be formed between the waterproof portion and the inner coating portion. Furthermore, since the waterproof portion is engaged within the cable insertion portion, a gap will hardly occur between the waterproof portion and the cable insertion portion, either. Therefore, the waterproof performance can be reliably maintained for an extended period of time.

Further, since the waterproof portion is configured to surround the end face of the inner coating portion, when e.g. the output cable is inserted into the cable insertion portion from the side of the waterproof portion, with the waterproof portion being kept attached to the output cable, it is possible to prevent roll-up of the waterproof portion due to the frictional resistance relative to the cable insertion portion. Therefore, the operation of inserting the output cable into the cable insertion portion can be carried out speedily.

Moreover, since the waterproof portion is disposed at the leading end of the output cable to be adjacent to the outer coating portion, it is possible to dispose the waterproof portion and the outer coating portion continuously, so that watertightness between the waterproof portion and the outer coating portion can be maintained.

Therefore, with the inventive output cable connection arrangement, the waterproof performance can be improved with disposing the waterproof portion at the leading end of the output cable, without having to change the material forming the outer coating portion and the material forming the inner coating portion of the widely used conventional output cable.

According to a second characterizing feature of the solar cell module terminal box output cable connection arrangement, an annular sealing member is provided on at least one of an outer surface and an inner surface of said waterproof portion.

For instance, when the annular sealing member is provided on the outer surface of the waterproof portion and this sealing member is held between the waterproof portion and the cable insertion portion, it becomes possible to reliably prevent intrusion of water to the interior of the terminal box from the outside via the gap between the waterproof portion and the cable insertion portion.

Similarly, when the annular sealing member is provided on the inner surface of the waterproof portion and this sealing member is held between the waterproof portion and the inner coating portion, it becomes possible to reliably prevent intrusion of water to the interior of the terminal box from the outside via the gap between the waterproof portion and the inner coating portion.

In this way, with disposing of the annular sealing member in the manners described above, the waterproof performance after the connection of the output cable can be improved.

According to a third characterizing feature of the solar cell module terminal box output cable connection arrangement, said cable insertion portion forms an annular recess corresponding to the sealing member provided on the outer surface of said waterproof portion.

With the above-described arrangement, the sealing member can be engaged within the annular recess with this sealing member provided on the outer surface of the waterproof portion being in gapless contact with the recess. With this arrangement, the area of gapless contact between the sealing member and the recess can be increased by an amount corresponding to the recess concavely formed. Thus, the waterproof performance after the connection of the output cable can be even further improved.

[3] Output Cable Fixation Arrangement

In the inventive fixation arrangement for an output cable of a solar cell module terminal box for achieving the third object, in an output cable fixation arrangement for a solar cell module terminal box wherein a terminal plate to be electrically connected to a solar cell module is provided inside a terminal box and an output cable electrically connected to the terminal plate is extended to the outside of the terminal box, according to a first characterizing feature, said output cable is fixed to said terminal box, separately from the electric connection thereof, by means of a cable fastener having a first fixing portion to be fixed to a barrel portion of the output cable and a second fixing portion to be fixed to a portion of the terminal box.

With the above-described arrangement, the output cable and the terminal box can be fixed integral with each other via the cable fastener. Hence, displacement of the output cable relative to the terminal box can be restricted for an extended period of time. Therefore, with this arrangement, the risk of impairment of the electric connection between the output cable and the terminal plate can be further restricted.

According to a second characterizing feature of the inventive solar cell module terminal box output cable fixation arrangement, said first fixing portion is formed like a band portion that can be wound and held around said barrel portion and said second fixing portion is formed as a T-like projection from said first fixing portion to be wound and held about the terminal box.

With the above-described arrangement, with the simple operations of winding and holding the first fixing portion around the barrel portion and winding and holding the second fixing portion around the terminal box, the output cable and the terminal box can be fixed integrally via the cable fastener.

According to a third characterizing feature of the inventive solar cell module terminal box output cable fixation arrangement, said first fixing portion forms a linear projection capable of applying a concentrated load to the outer face of said barrel portion.

With the above-described arrangement, by causing the linear projection to bite into the outer face of the barrel portion, it is readily possible to cause the first fixing portion to be firmly wound and held around the barrel portion.

According to a fourth characterizing feature of the inventive solar cell module terminal box output cable fixation arrangement, said terminal box forms a cable holding portion cable of allowing insertion of said second fixing portion of the output cable to which said cable fastener is attached and capable also of holding/surrounding an area extending at least half a perimeter of the portion to which said first fixing portion is fixed or adjacent said first fixing portion.

With the above-described arrangement, with the second fixing portion being oriented toward the connection side for the terminal plate of the output cable, it is possible to surround an area extending for at least half the perimeter of the portion to which the first fixing portion is fixed of the output cable with the cable fastener is fastened or the portion of the output cable adjacent the first fixing portion.

Therefore, the fixation posture of the output cable relative to the terminal box can be readily maintained for an extended period of time so that the electric connection of the output cable relative to the terminal plate will not be impaired.

MODES OF EMBODYING THE INVENTION

[1] Terminal Box

Next, an embodiment of a terminal box according to the present invention will be described with reference to the accompanying drawings.

Figure 1:
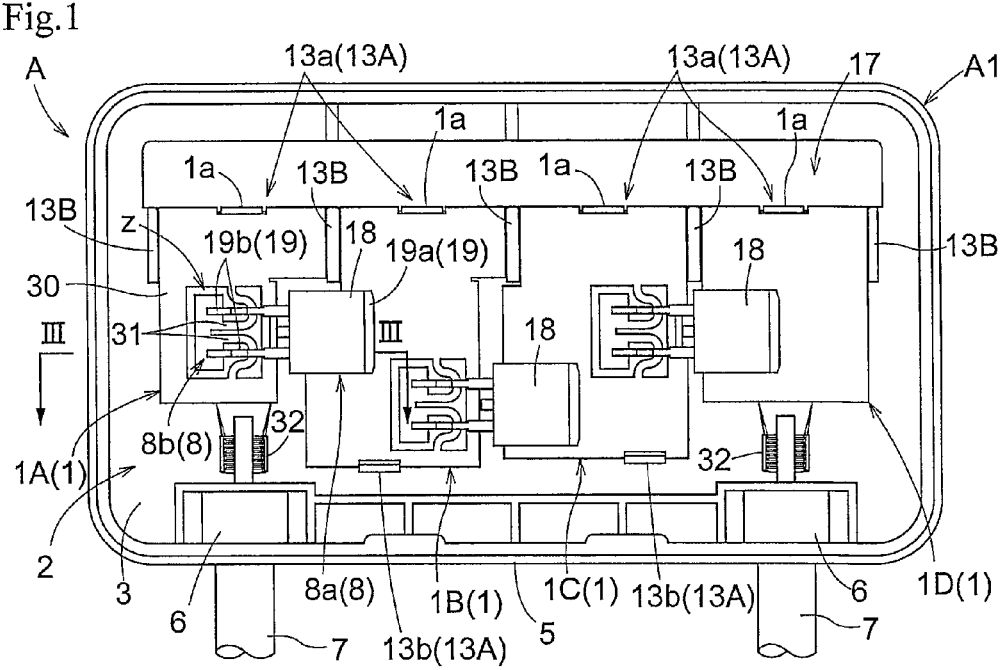
FIG. 1 is a front view of a terminal box.
Figure 2:
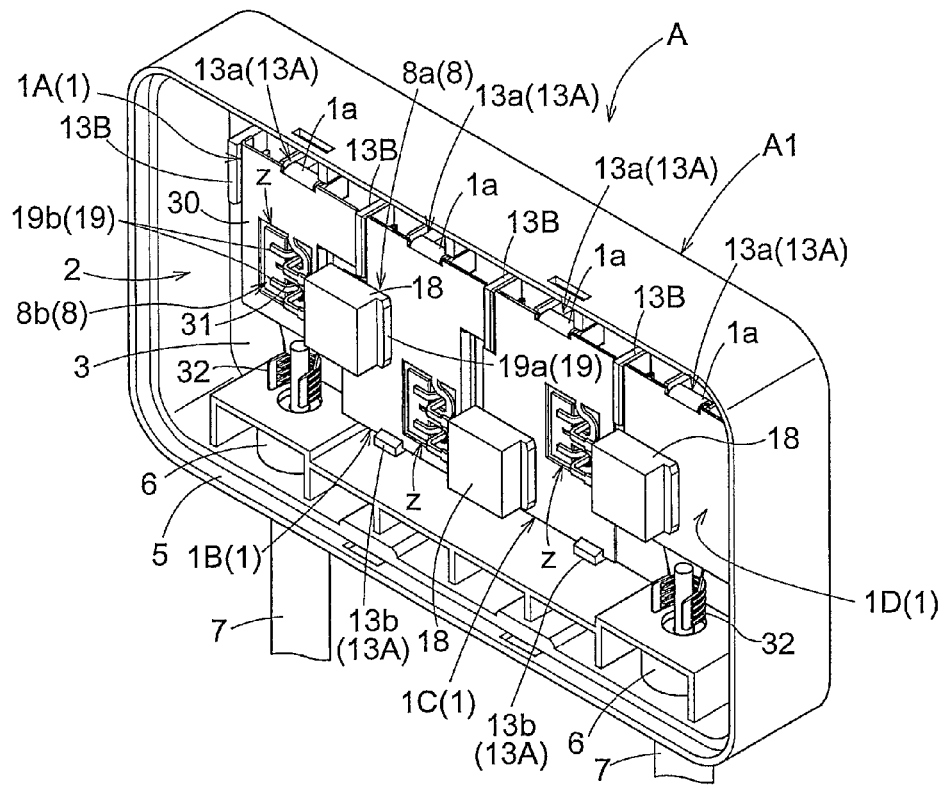
FIG. 2 is a perspective view of the terminal box.

FIG. 1 and FIG. 2 show a terminal box A of a solar cell module (an example of "attachment target").

The terminal box A includes a box body A1 formed of resin and provided in the form of a rectangular box mounting therein four terminal plates 1 to be electrically connected to the solar cell modules (not shown) and a lid member (not shown) formed of resin and configured to close an opening 2 of the box body A1.

On a bottom plate 3 of the box body A1, there are formed as projections, two kinds of holding portions 13A to which the respective terminal plates 1 are to be retained and holding walls 13B configured to come into contact with the edges of the respective terminal plates 1 and fix the respective terminal plates 1, at positions corresponding to the respective terminal plates 1. Further, the bottom plate 3 defines insertion holes 17 as through holes, for allowing insertion of output terminals (not shown) of the solar cell modules (not shown) to be electrically connected to the respective terminal plates 1.

One of the holding portions 13A is comprised of a linear-shaped retained portion 13a to which a retaining portion 1a provided on one side of the terminal plate 1 is to be retained to be held thereto. The other one of the holding portions 13A is comprised of a groove-like engaging portion 13b into which the other side portion of the terminal plate 1 is to be engaged.

A side plate 5 of the box body A1 defines, at opposed ends thereof, cable insertion holes 6 for allowing insertion of a pair of output cables 7 connected from the terminal plates 1 to e.g. a rechargeable battery or the like, with maintaining waterproof condition.

Each terminal plate 1 is formed of a conductive metal plate. And, as the plate is clamped and held by the holding portion 13A and the holding wall 13B, the terminal plates 1 are juxtaposed in spaced relationship and in mutually isolated state.

Incidentally, adjacent terminal plates 1 are electrically interconnected via a bypass diode (simply "diode" hereinafter) 18.

Figure 3:
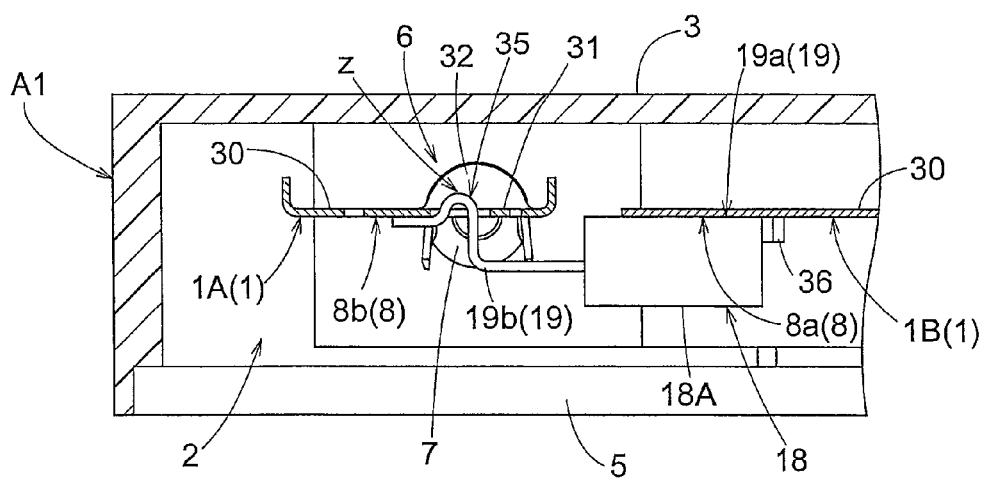
FIG. 3 is a section view of principal portions showing an attachment condition between a terminal plate and a diode.
Figure 4:
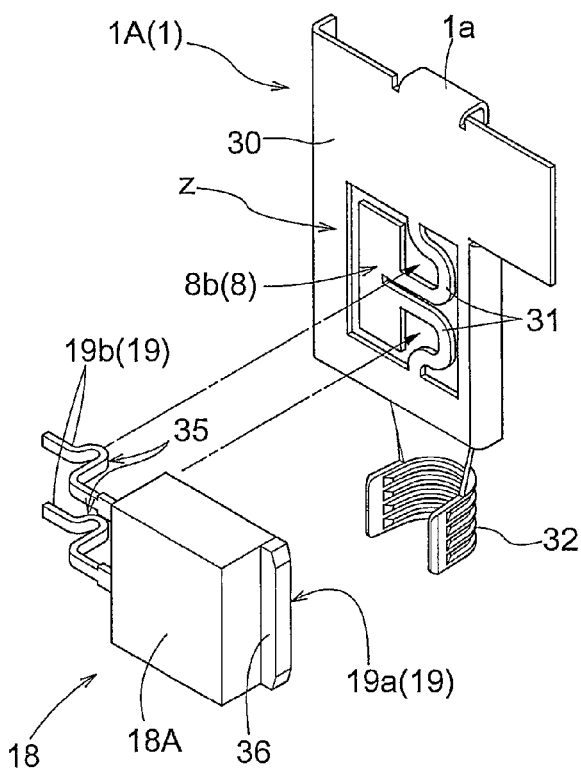
FIG. 4 is an exploded perspective view of principal portions showing an attachment condition between the terminal plate and the diode.
Figure 5:
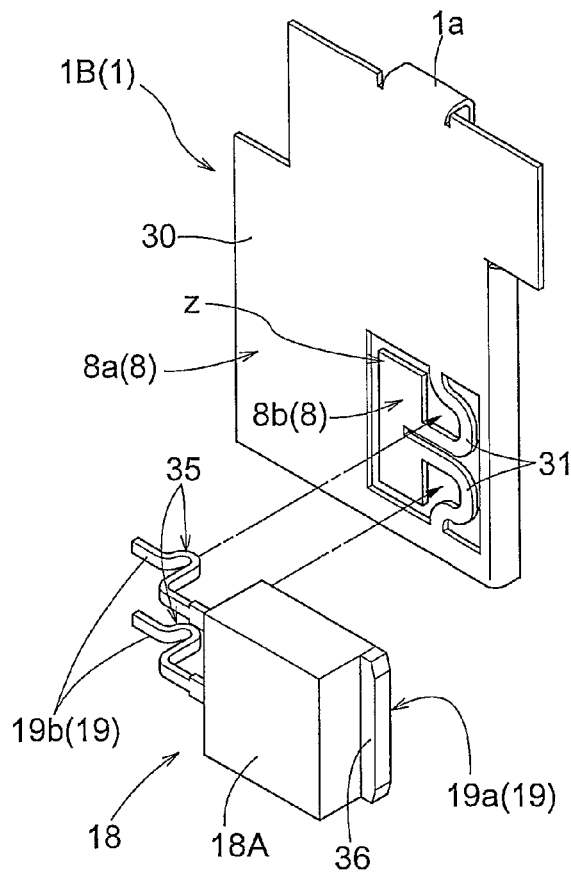
FIG. 5 is an exploded perspective view of principal portions showing an attachment condition between the terminal plate and the diode.

The diode 18, as shown in FIGS. 3 through 5, is provided as a packaged or unitary diode including a diode body 18A formed integral as a rectangular block-like plate member and a lead terminal portion 19.

The lead terminal portion 19 includes a pair of anode electrodes 19b projecting perpendicularly from one end face of the diode body 18A and a cathode electrode 19a formed integral with and along one end face of the diode body 18A.

As shown, the pair of anode electrodes 19b are provided as metal band-like members juxtaposed with a space therebetween along the width direction.

The leading end of the anode electrode 19b in the longitudinal direction is fixedly attached by means of soldering to a fixed attachment portion 8 of the terminal plate 1 to be detailed later.

The intermediate portion of the anode electrode 19b in the longitudinal direction is treated with a forming work to obtain a letter-"J" shape in its vertical section. With provision of this forming-machined portion 35, a relative positional change which may occur between the leading end portion and the base end portion of the anode electrode 19b can be readily absorbed through a flexion deformation.

The cathode electrode 19a, as shown, is comprised of a metal rectangular plate provided integral with a portion of the back face portion of the diode body 18A. A terminal edge portion of the cathode electrode 19a forms a projecting edge portion 36 projecting by a certain length from the other end face of the diode body 18A. This projecting edge portion 36 is fixedly attached by means of soldering to the fixed attachment portion 8 (a cathode side fixed attachment portion 8a to be described later) of the terminal plate 1.

Each one of the four juxtaposed terminal plates 1 includes a terminal plate body 30 having an approximately rectangular shape, a pair of fixed attachment portions 8 to which the pair of lead terminal portions 19 (the cathode electrode 19a, the anode electrode 19b) of the diode 18 are fixedly attached, and a bridge portion (corresponding to the "displacement allowing connecting portion") 31 for electrically connecting the terminal plate body 30 and the one fixed attachment portion 8 (the anode side fixed attachment portion 8b to which the anode electrode 19b is fixedly attached) with allowing relative displacement therebetween. At one side of each terminal plate 1 in the direction normal to the juxtaposing direction, there is provided a retaining portion 1a.

Incidentally, of the pair of fixed attachment portions 8, the cathode side fixed attachment portion 8a to which the cathode electrode 19a is fixedly attached is formed as a portion of the terminal plate body 30 without providing the bridge portion 31 (see FIG. 5).

Of the four juxtaposed terminal plates 1, the first terminal plate 1A and the fourth terminal plate 1D located on the opposed ends, respectively include, at the other side thereof, a caulking connection portion 32 for electrically connecting the output cable 7, as shown in FIG. 4. Further, of the fourth terminal plates 1, the second terminal plate 1B and the third terminal plate 1C located at the center, respectively is configured such that the other side thereof is engaged into an engaging portion 13b (see FIG. 2).

Therefore, the first terminal plate 1A and the fourth terminal plate 1D, as shown in FIGS. 1 and 2, are disposed with the opposed edge portions thereof being held by the holding walls 13B of the box body A1 and with the retaining portion 1a of the one side being retained to the retained portion 13a of the box body A1. And, to the caulking connection portion 32, a terminal end of the output cable 7 inserted through the cable insertion portion 6 of the box body A1 is electrically connected by means of calking fixation.

Further, the second terminal plate 1B and the third terminal plate 1C are disposed with the opposed edge portions thereof being held by the holding walls 13B of the box body A1 and with the other side being engaged in the engaging portion 13b of the box body A1 and also with the retaining portion 1a on the one side being retained to the retained portion 13a of the box body A1.

Next, the anode side fixed attachment portion 8b and the bridge portion 31 of the terminal plate 1 will be explained.

The bridge portion 31 and the anode side fixed attachment portion 8b, as shown in FIG. 4 and FIG. 5, are formed at a portion surrounded by a cutaway zone Z which is formed by cutting away a portion of the terminal plate 1.

In this embodiment, the anode side fixed attachment portion 8b is constituted from a rectangular portion formed in the cutaway zone Z to be spaced from the terminal plate body 30.

Further, the bridge portions 31 are provided as a pair and constituted from narrow curved portions provided integrally from one longitudinal side of the rectangular anode side fixed attachment portion 8b to the inner peripheral edge portion facing the cutaway zone Z of the terminal body 30. And, the curve shape is set as a letter-J shape (or right/left reversed J shape) as seen in the plan view.

Due to such a cause as a temperature change, there may be developed a stress between adjacent terminal plates 1, between the diode 18 and the terminal plate 1 or between the box body A1 and the terminal plate 1, and this stress may be applied to the bonding portion between the lead terminal portion 19 and the fixed attachment portion 8. However, with the provision of the bridge portion 31, stress concentration can be alleviated through flexion deformation of the bridge portion 31 to absorb the stress.

The bridge portion 31 has a width set be smaller than the fixed attachment portion 8 and terminal plate body 30, so that the bridge portion 31 with the reduced sectional area can absorb the deformation faster than the other portion.

With the terminal box A according to this embodiment, with the provision of the bridge portion 31, displacement between the diode 18 and the terminal plate body 30 is allowed with keeping their connected state. For instance, even if forces along different directions are applied to the diode 18 and the terminal plate 1 respectively, due to a temperature difference of the environment, these can be absorbed by the bridge portion 31, so that connection failure therebetween can be prevented.

Therefore, even when this terminal box A is connected to a component such as a solar cell module which is to be installed in an environment subject to violent temperature change, connection failure hardly occurs.

Further, as the bridge portion 31, there is employed one having a width designed to be smaller than the other portion, the arrangement does not require much trouble and can be provided inexpensively.

Other Embodiments

Figure 6:
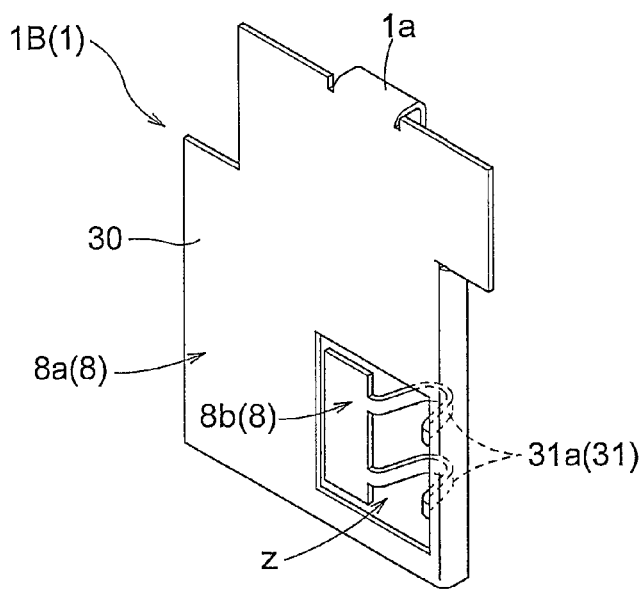
FIG. 6 is a perspective view showing a displacement-allowing connecting portion according to a further embodiment.

Other embodiments will be described next.
(1) The terminal box A is not limited to the one having the shape and the construction described in the foregoing embodiment. For instance, instead of the rectangular plan shape, any other non-rectangular shape, such as a polygonal shape, circular shape, oval shape, etc. can be used. Further, it can be a box-like construction without a lid.
(2) The terminal plates 1 are not limited to the number and the construction described in the foregoing embodiment. For instance, instead of four of them, any desired number of them other than four can be provided. Further, the number of the diodes 18 will be one smaller than the number of terminal plates 1.
(3) The displacement-allowing connecting portion 9 is not limited to the one having the letter-J plan shape (or the right/left reversed letter-J shape) described in the foregoing embodiment. This can also be a linear or arcuate portion, etc. Further, instead of its arrangement having a smaller width than the other portion, an arrangement of having a smaller thickness so as to have a smaller cross sectional area than the other portion can be employed also. Further, rather than such dimensional arrangement, it is also possible to employ a material that can be deformed more easily than the other portion in forming this portion.
(4) As a further embodiment of the displacement-allowing connecting portion 9, as shown in FIG. 6, this can include a curved portion 31a bent in the thickness direction, at the bridge portion which is formed linear in the front view. In this case, thanks to the curved portion 31a, the bridge portion can be displaced readily in the thickness direction of the terminal plate also. With this, it becomes possible to smooth displacement between the fixed attachment portion 8 and the terminal plate body 30 in any desired direction, along the width direction, the thickness direction and the length direction of the bridge portion, so that even higher displacement allowing performance can be achieved.
(5) The displacement-allowing connecting portion 9 can be provided on each of the both lead terminal portions 19 of the diode 18.
(6) In the foregoing embodiment, in the diode 18, a pair of electrodes perpendicularly projecting from one end face of the diode body 18A are provided as the anode electrode and the electrode formed integral along the other end face of the diode body 18A is provided as the cathode electrode. However, depending on the product or user's requirement, the electrodes can be reversed from each other.

[2] Output Cable Connection Arrangement

Next, an embodiment of an output cable connection arrangement according to the present invention will be explained.

The invention provides a connection arrangement for an output cable for a solar cell module terminal box to be electrically connected to a plurality of terminal plates 1 provided inside the terminal box A to be electrically connected to a solar cell module (not shown) through a cable insertion portion 6 provided in the terminal box A from the outside of the terminal box A (FIGS. 7-10).

The output cable 7 connection arrangement is used for inserting the output cable 7 into the cable insertion portion 6 with a waterproof portion 10 and an outer coating portion 9b being engaged within the cable insertion portion 6. The waterproof portion 10 covers an outer peripheral face 91a and an end face 91b of a leading end 91 of an inner coating portion 9a coating a core wire 7a of the output cable 7. The outer coating portion 9b coats the inner coating portion 9a adjacent the waterproof portion 10.

The solar cell module is connected in series or parallel with a solar cell module disposed adjacent thereto. The terminal box A is attached to the back face of the solar cell module when the respective electrodes of the solar cell modules are to be electrically connected with each other.

The terminal box A in this embodiment includes a terminal box body A1 formed of a resin and in the form of a rectangular box accommodating therein two terminal plates 1 to be electrically connected to the solar cell modules and a lid member (not shown) made of a resin and configured to over the opening 2 of the box body A1.

Figure 7:
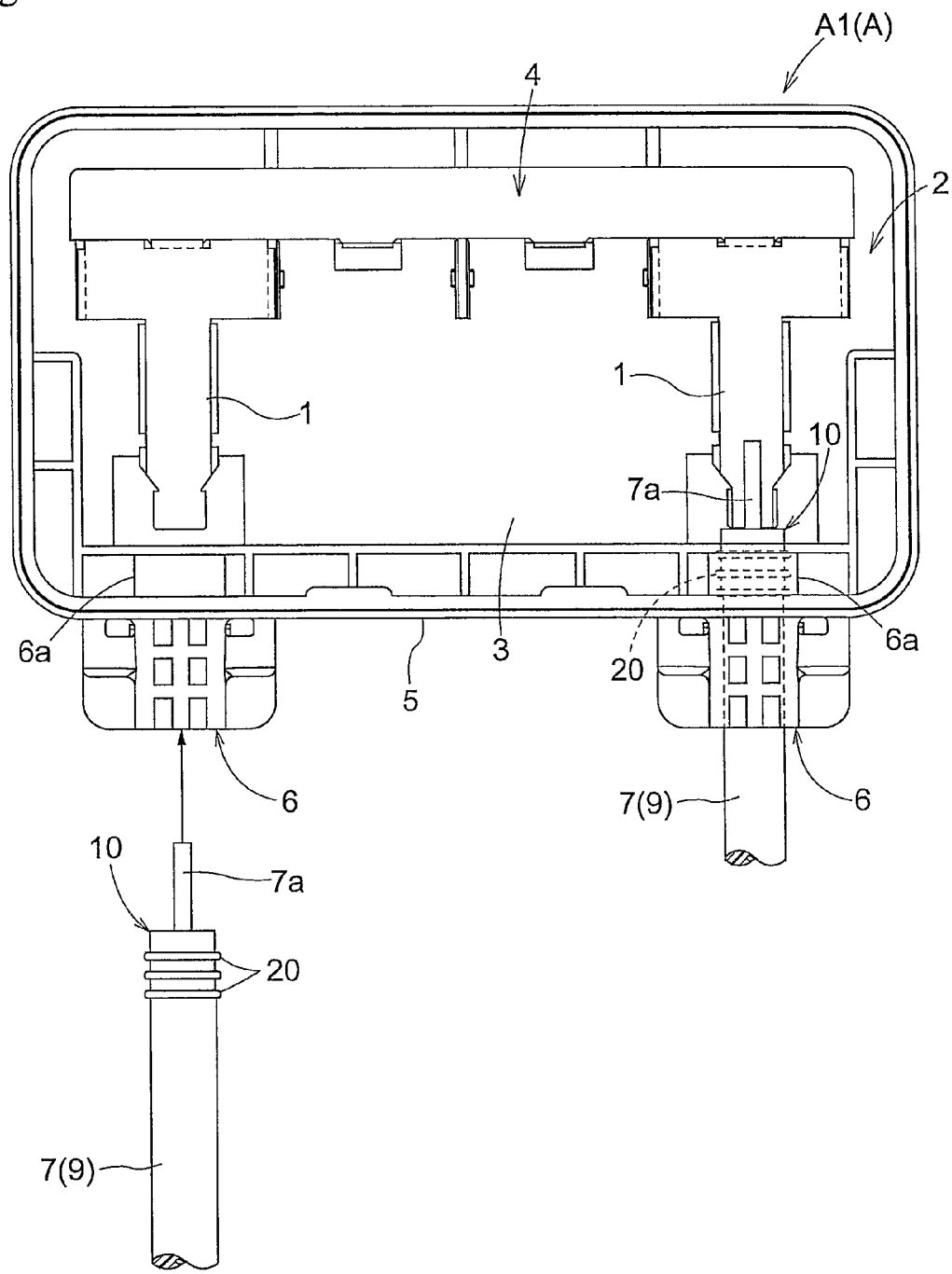
FIG. 7 is a schematic showing a connection arrangement for an output cable.
Figure 8:
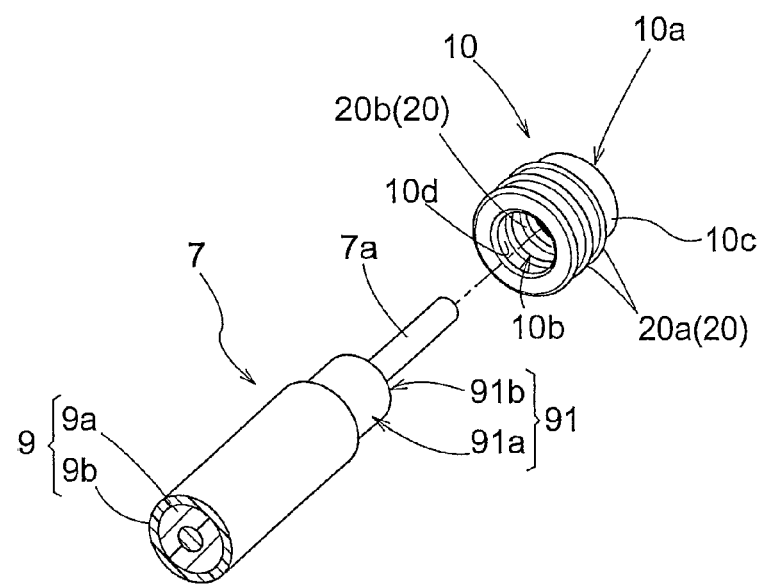
FIG. 8 is a perspective view showing a waterproof portion and an output cable.
Figure 9:
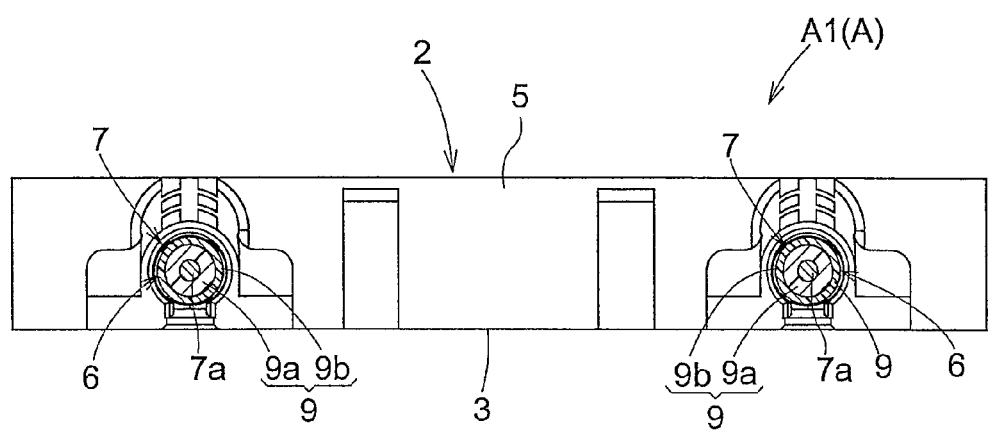
FIG. 9 is a horizontal section showing a connection arrangement for an output cable.

As shown in FIG. 7, the terminal plate 1 is assembled with being retained to the bottom plate 3 of the box body A1. And, this bottom plate 3 defines therethrough an insertion hole 4 for introducing the output terminals (not shown) of the solar cell modules to be electrically connected to the respective terminal plates 1. Incidentally, though not shown, the terminal plates 1 are electrically interconnected via a bypass diode.

A side wall 5 of the box body A1 defines therethrough cable insertion portions 6. The output cable 7 electrically connected to each terminal plate 1 is inserted into each cable insertion portion 6 to be extended to the outside of the box body A1. Each cable insertion portion 6 is communicated to a boss 6a formed integrally in the side wall 5 toward the inside of the box body A1.

The output cable 7 includes the core wire 7a and an insulating coating layer 9 coating the core wire 7a. The insulating coating layer 9 is provided for protecting and insulating the core wire 7a and includes the inner coating portion 9a coating the core wire 7a and the outer coating portion 9b coating the inner coating portion 9a. The inner coating portion 9a is formed generally of such a material as cross-linked polyethylene (PE) whereas the outer coating portion 9b is formed generally of such a material as cross-linked polyolefin or heat-resistive vinyl chloride.

The waterproof portion 10 employed in the present invention is provided for coating the outer peripheral face 91a and the end face 91b of the leading end portion 91 of the inner coating portion 9a. Further, this waterproof portion 10 is disposed at the leading end of the output cable 7 to be adjacent the outer coating portion 9b. As the output cable 7 is machined such that the core wire 7a projects from the end face 91b. Hence, on one side (the side where the core wire 7a projects) of the waterproof portion 10, there is formed a hole portion 10a having a diameter sufficient to allow insertion of the core wire 7a. On the other hand, at the other side of the waterproof portion 10, there is formed a hole portion 10b having a diameter sufficient for allowing insertion of the inner coating portion 9a.

The waterproof portion 10 can be formed of e.g. an elastic material such as rubber. In his case, due to its elastic effect, the inner coating portion 9a and the cable insertion portion 6 can respectively be placed in reliable gapless contact with the waterproof portion 10.

The outer coating portion 9b tends to become brittle due to aged deterioration as this portion is normally exposed directly to the outside environment such as ultraviolet rays. Therefore, there is the risk of developing a crack therein or its outer shape may be deformed. And, these would cause deterioration in the waterproof performance thereof. The waterproof portion 10 in the present invention is configured not for covering the outer surface of the outer coating portion 9b, but for covering the outer peripheral face 91a and the end face 91b of the leading end portion 91 of the inner coating portion 9a. As this inner coating portion 9a is coated with the waterproof portion 10 and the outer coating portion 9b, there is no direct exposure thereof to the outside environment. Therefore, crack or outer shape deformation due to aging degradation will hardly occur and a gap will hardly be formed between the waterproof portion 10 and the inner coating portion 9a. Further, as the waterproof portion 10 is engaged within the cable insertion portion 6, a gap will hardly be formed between the waterproof portion 10 and the cable insertion portion 6 either. Therefore, the waterproof performance can be maintained reliably for an extended period of time.

Further, the waterproof portion 10 is configured to cover the end face 91b of the inner coating portion 9a. Therefore, e.g. when the output cable 6 is inserted into the cable insertion portion 6 from the side of the waterproof portion 10, with the waterproof portion 10 being kept attached to the output cable 7, it is possible to prevent roll-up of the waterproof portion 10 due to the frictional resistance relative to the cable insertion portion 6. Hence, the operation of inserting the output cable 7 into the cable insertion portion 6 can be carried out speedily.

Further, the waterproof portion 10 is disposed at the leading end of the output cable 7 to be adjacent the outer coating portion 9b. Hence, it is possible to dispose the waterproof portion 10 and the outer coating portion 9b continuously, so that water-tightness between the waterproof portion 10 and the outer coating portion 9b can be maintained.

When the waterproof portion 10 is to be disposed at the leading end of the output cable 7, the outer coating portion 9b present adjacent this leading end of the output cable 7 will be removed beforehand.

Preferably, in the waterproof portion 10, the thickness (T) of its portion covering the outer peripheral face 91a of the inner coating portion 9a should be about equal to the thickness (t) of the outer coating portion 9b. In this case, the diameter of the portion where the waterproof portion 10 is disposed at the leading end of the output cable 7 will become approximately equal to the diameter of the portion having the outer coating portion 9b. When the output cable 7 is inserted in the cable insertion portion 6 under such condition as above, the pore diameter of the cable insertion portion 6 should be uniform for the entire cable insertion portion 6. That is, with the above-described arrangement, the machining of the cable insertion portion 6 can be carried out easily.

An annular sealing member 20 may be provided on at least one of an outer surface 10c and an inner surface 10d of the waterproof portion 10. This sealing member 20 may be formed of an elastic material such as rubber. The sealing member 20 is to be disposed in the form of an O-ring for example, as being bonded to or in gapless contact with the outer surface 10c of the waterproof portion 10. Alternatively, the waterproof portion 10 and the sealing member 20 can be formed integral.

Figure 10:
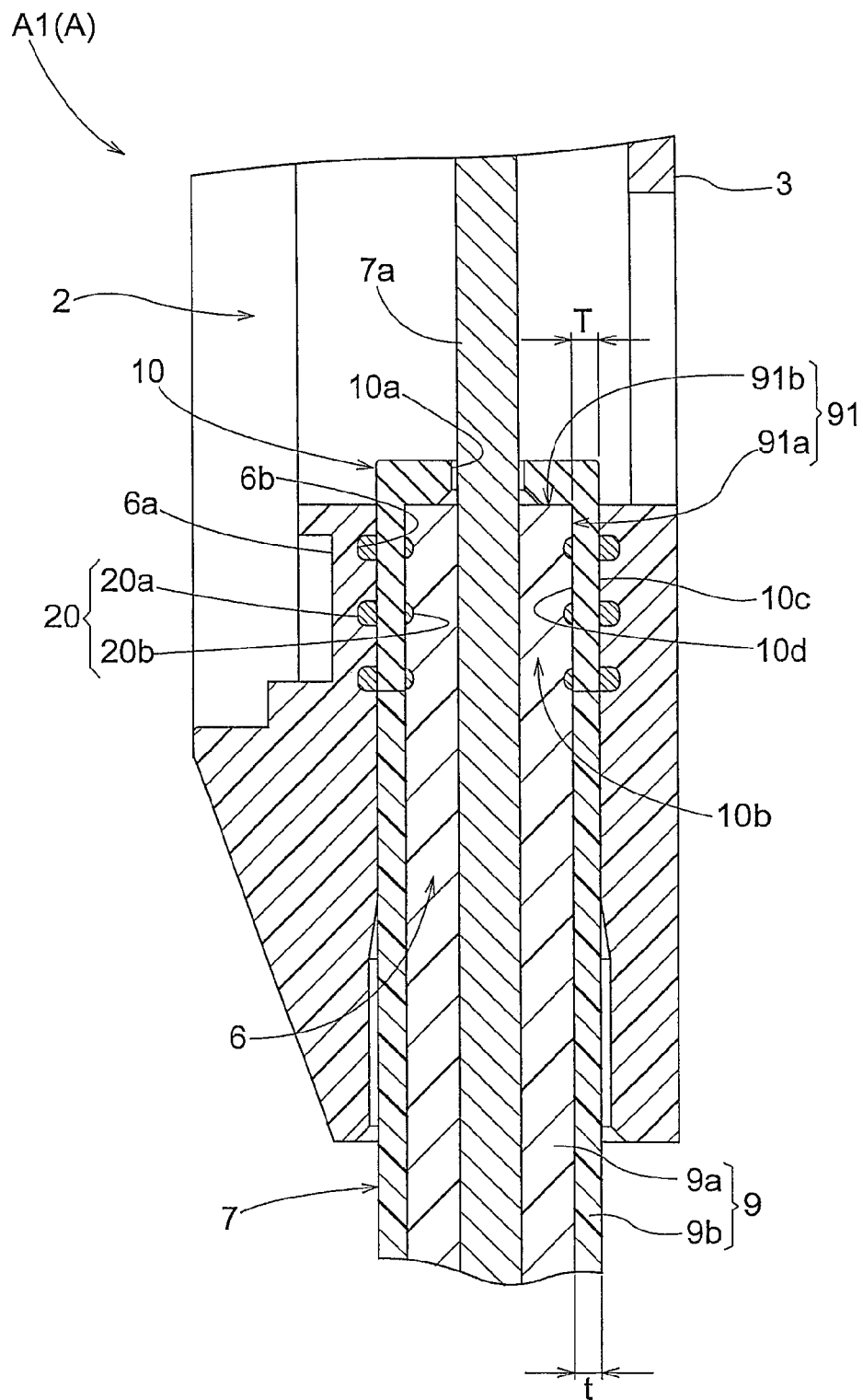
FIG. 10 is a vertical section showing a connection arrangement for an output cable.

The sealing member 20 provided in this embodiment, as shown in FIG. 10 for instance, includes three outer sealing members 20a on the outer surface 10c of the waterproof portion 10, and three inner sealing members 20b provided on the inner surface 10d of the waterproof portion 10. With this arrangement, the respective water proof portions 10 and the respective cable insertion portions 6 and the respective outer sealing members 20a can be placed in gapless contact in a reliable manner. With the above-described disposing of the outer sealing members 20a, it is possible to prevent intrusion of water from the outside to the interior of the terminal box A through between the waterproof portion 10 and the cable insertion portion 6.

Similarly, with the above arrangement, the respective waterproof portions 10 and the respective inner coating portions 9a and the respective inner sealing members 20b can be placed in gapless contact in a reliable manner. So that, it is possible to prevent intrusion of water from the outside to the interior of the terminal box A through between the waterproof portion 10 and the inner coating portion 9a.

In particular, with the provision of the outer sealing members 20a and the inner sealing members 20b respectively at three positions, reliable waterproof performance can be achieved.

For the above-described reason, with disposing of the annular sealing member 20, the waterproof performance after the connection of the output cable 7 can be improved.

The cable insertion portion 6, as shown in FIG. 10, forms annular recesses 6b in correspondence with the outer sealing members 20a disposed on the outer surface 10c of the waterproof portion 10. With this arrangement, the outer sealing members 20a can be engaged within the recesses 6b with these outer sealing members 20a being placed in gapless contact with the recesses 6b. With this arrangement, the area of gapless contact between the outer sealing member 20a and the recess 6b can be increased by the amount of the recess 6b formed concave. Hence, the waterproof performance under the connected condition of the output cable 6 can be even further improved.

With the formation of the recesses 6b as provided in the above-described arrangement, the output cable 7 with the waterproof portion 10 being attached thereto can be inserted into the cable insertion portion 6, with the sealing member 20 being disposed within the recess 6b in advance.

[3] Output Cable Fixation Arrangement

Next, an embodiment of an output cable fixation arrangement also relating to the present invention will be described with reference to the accompanying drawings.

First Embodiment

Figure 11:
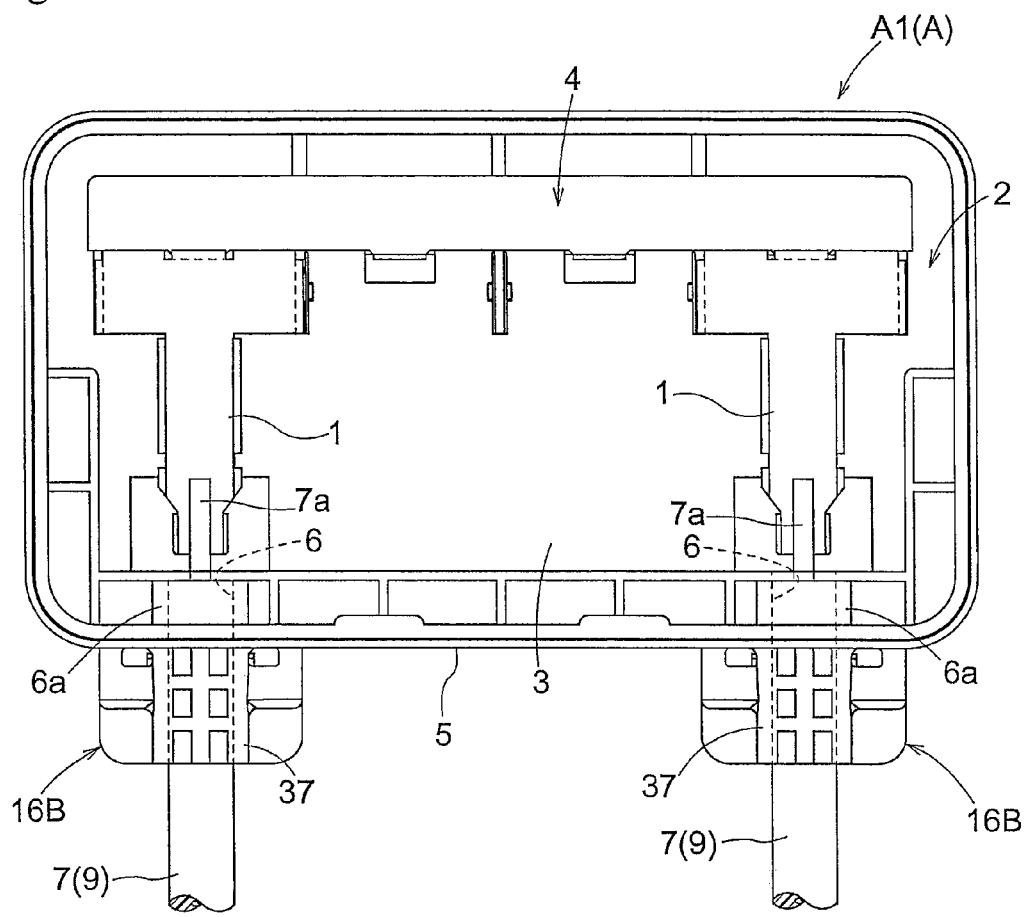
FIG. 11 is a plan view showing inside of a box body.
Figure 12:
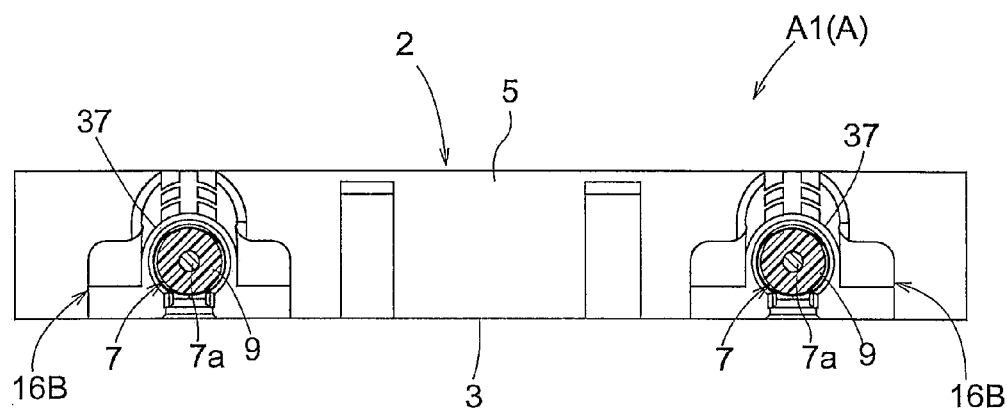
FIG. 12 is a front view of the box body.
Figure 13:
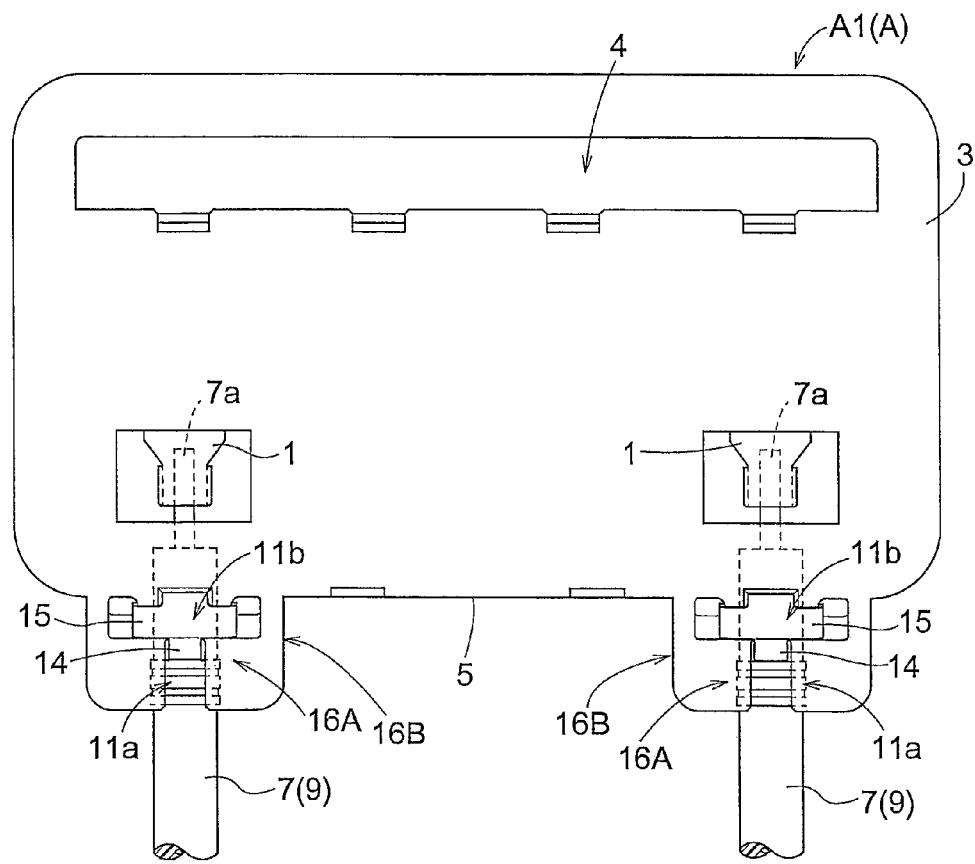
FIG. 13 is a front view showing a bottom face of the box body.

FIGS. 11-13 show a solar cell module terminal box A.

The terminal box A includes a terminal box body A1 formed of a resin and in the form of a rectangular box accommodating therein two terminal plates 1 to be electrically connected to the solar cell modules and a lid member (not shown) made of a resin and configured to over the opening 2 of the box body A1.

The terminal plate 1 is assembled with being retained to the bottom plate 3 of the box body A1. And, this bottom plate 3 defines therethrough an insertion hole 4 for introducing the output terminals (not shown) of the solar cell modules to be electrically connected to the respective terminal plates 1. Incidentally, though not shown, the terminal plates 1 are electrically interconnected via a bypass diode.

A side wall 5 of the box body A1 defines therethrough cable insertion portions 6. The output cable 7 electrically connected to each terminal plate 1 is inserted into each cable insertion portion 6 to be extended to the outside of the box body A1. Each cable insertion portion 6 is communicated to a boss 6a formed integrally in the side wall 5 toward the inside of the box body A1.

The output cable 7 is inserted through each cable insertion portion 6 and the boss 6a to be extended to the outside of the box body A1. This output cable 7 is fixed to the box body A1 separately from its electrical connection with the terminal plate 1, by means of an inventive output cable fixation arrangement using a cable fastener (clamper) 16A made of a plate metal.

Incidentally, as the cable fastener 16A is made of a metal material, stress relaxation is less likely to occur in this member as compared with a cable fastener made of a resin. So, even under an adverse condition such as high temperature and high humidity where the solar cell module is to be installed, the possibility of positional displacement of the output cable 7 relative to the terminal box A can be reduced for an extended period of time.

Figure 14:
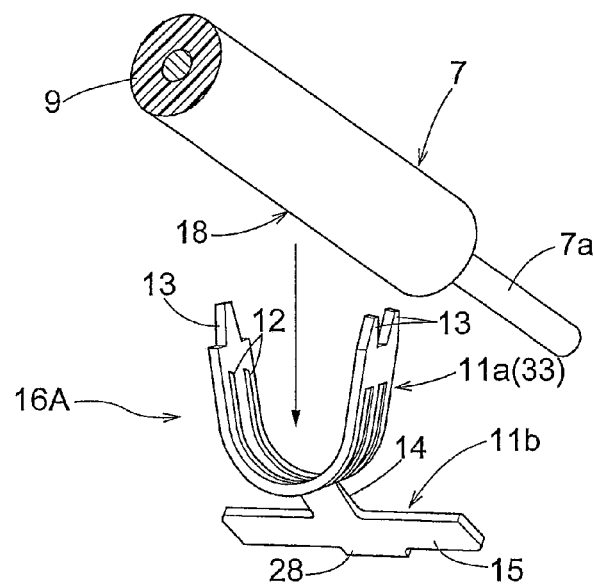
FIG. 14 is a perspective view of a cable fastener.
Figure 15:
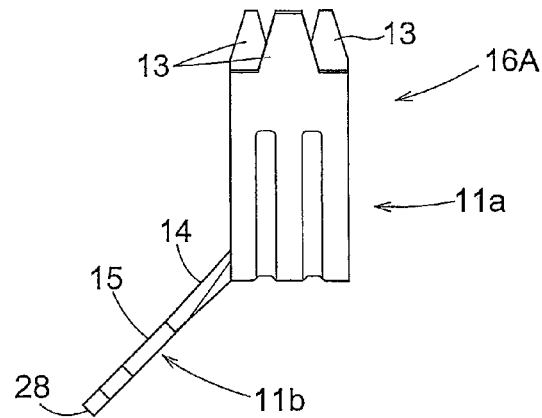
FIG. 15 is a side view of the cable fastener, FIG. 16 a front view of the cable fastener.
Figure 16:
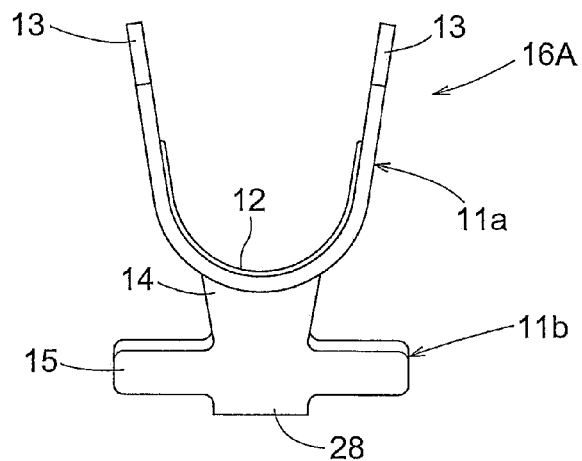

The output cable 7 includes the core wire 7a and an insulating coating layer 9 coating the core wire 7a. As shown in FIGS. 14-16, the cable fastener 16A includes a first fixing portion 11a to be fixed on the insulating coating layer 9 constituting the barrel portion of the output cable 7 and a second fixing portion 11b to be fixed to a portion of the box body A1.

The first fixing portion 11a is constituted from a curved band plate member curved in the letter-U shape. This first fixing portion 11a can be wound and held on the insulating coating layer 9 as being wound around the insulating coating layer 9 and fixed thereto by caulking.

Further, the first fixing portion 11a forms a plurality of linear projections 12 projecting toward the inner peripheral face along the longitudinal direction of the curved band like plate member (first fixing portion) 11a. With this, the first fixing portion 11a can apply a concentrated load to the outer peripheral face of the insulating coating layer 9 at the time of fixing by caulking.

At the opposed longitudinal ends of the curved band plate member 11a, there are formed pawls 13 which bite into the output cable 7 to be adjacent each other in the plate width direction when being fixed to the output cable 7 by caulking.

The second fixing portion 11b is configured to be wound and held around a portion of the box body A1. More particularly, the second fixing portion 11b includes a narrow connecting plate member 14 extended from the curved band plate member 11a and having a narrower width than the output cable 7 and a flat band plate member 15 formed continuously from the connecting plate member 14 and fixedly calked to a portion of the box body A1 and the second fixing portion 11b projects in the letter T-shaped from the curved band plate member 11a.

Figure 17:
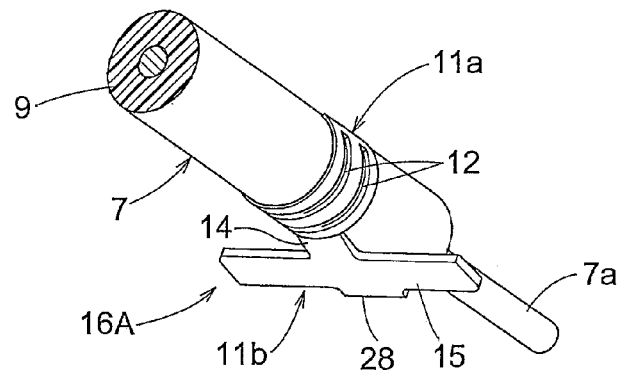
FIG. 17 is a perspective view illustrating a condition wherein a curved band-like member (first fixing portion) of the cable fastener is fixed to the output cable, FIG. 18 (*a*) is a perspective view showing a cable fixing portion before fixation of the output cable as seen from the side of the bottom face of the box body, FIG. 18 (*b*) is a perspective view showing the cable fixing portion after fixation of the output cable as seen from the side of the bottom face of the box body.
Figure 18:
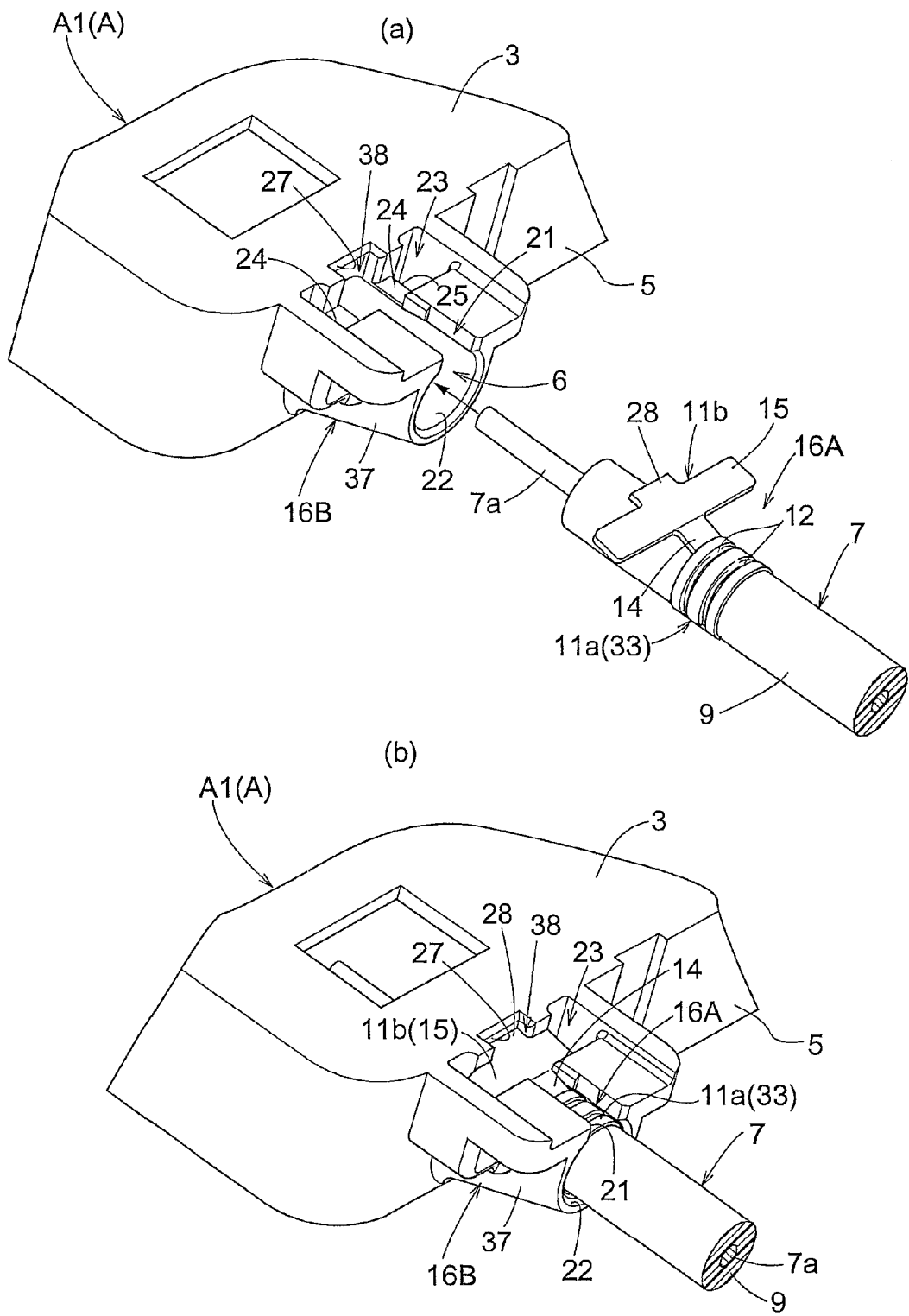
Figure 19:
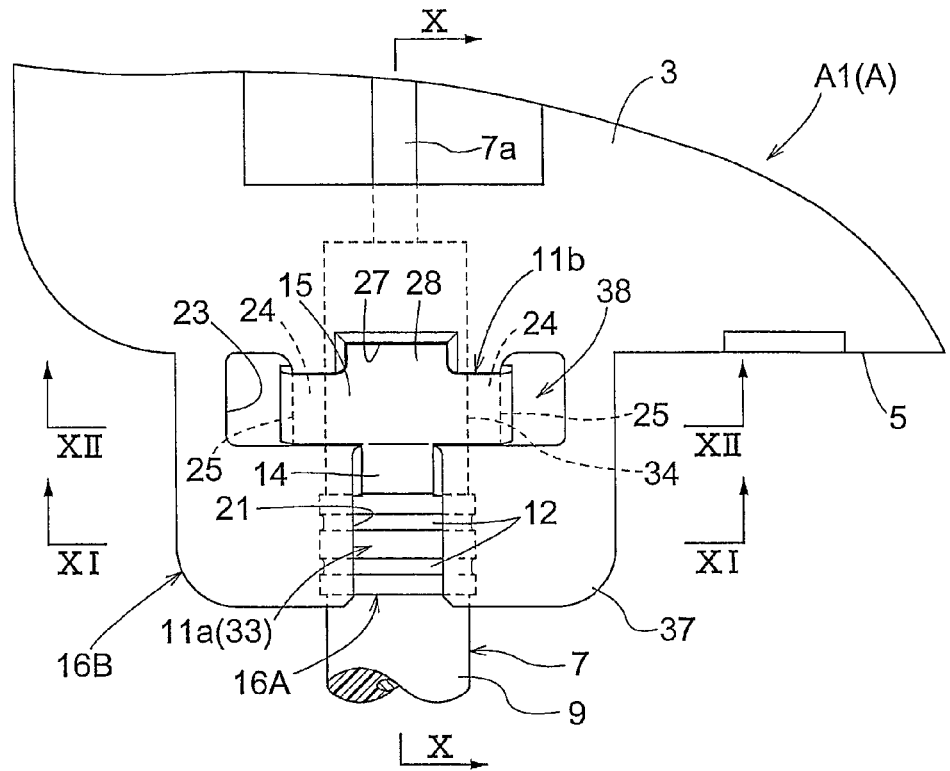
FIG. 19 is a plan view showing the cable fixing portion as seen from the side of the bottom face of the box body.
Figure 20:
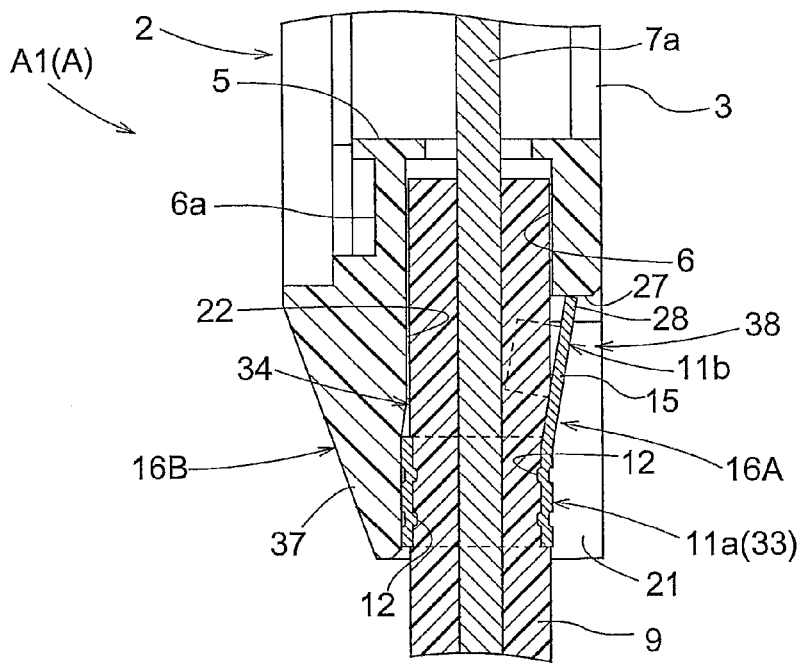
FIG. 20 is a section taken along a line X-X in FIG. 19.
Figure 21:
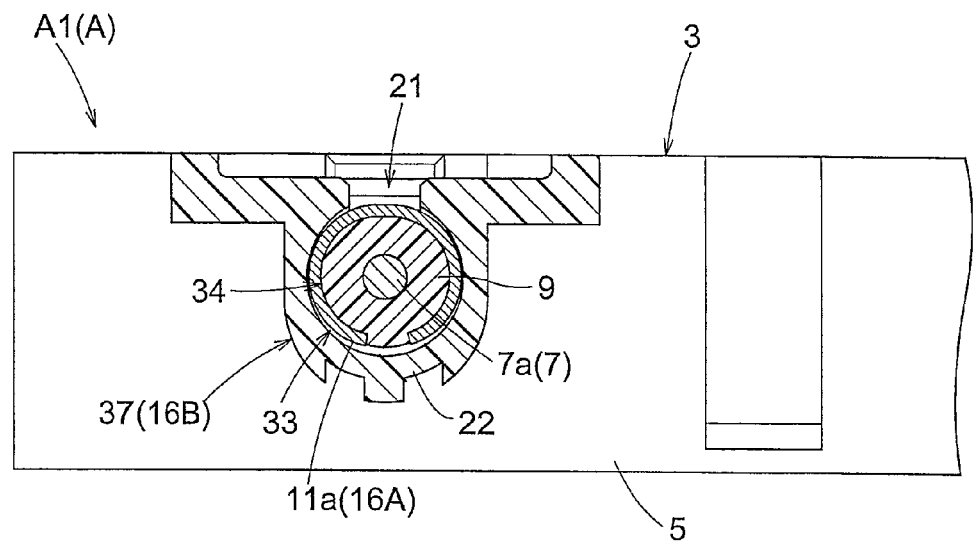
FIG. 21 is a section taken along a line XI-XI in FIG. 19.

With the cable fastener 16A, as illustrated in FIG. 17, with the flat band plate member 15 being set under a posture toward the connecting portion to the terminal plate 1 of the output cable 7, the curved band plate member 11a is fixedly caulked to the outer peripheral face of the insulating coating layer 9.

On the outer side (the outer side of the terminal box A) of the side wall 5 of the box body A1 around the cable insertion portion 6, a cable fixing portion 16B is formed of resin and in flush with the lower face of the bottom plate 3 of the box body A1. With this cable fixing portion 16B, the curved band plate member (first fixing portion) 11a of the cable fastener 16A fixes the output cable 7 fixedly caulked therein in advance, to the box body A1.

As shown in FIGS. 18 through 22, the cable fixing portion 16B includes a cable holding portion 37. This cable holding portion 37 allows insertion thereto of the second fixing portion 11b of the output cable 7 to which the cable fastener 16A is attached in advance. Also, this holding portion 37 holds a fixing portion 33 to which the curved band plate member 11a is fixed and a cable portion 34 adjacent the curved band plate member 11a.

Further, the cable fixing portion 16B includes a caulking fixing portion (see FIG. 22) 20 to which the flat band plate member 15 of the second fixing portion 11b is to be fixedly caulked.

The cable holding portion 37 forms a cylindrical portion 22 and this cylindrical portion 22 forms a slit 21. This slit 21 has a width designed to allow passage of the second fixing portion 11b (connecting plate member 14) when the output cable 7 to which the curved band plate member 11a of the cable fastener 16A is fixedly caulked in advance is to be inserted into the cable insertion portion 6 and which is designed also to be capable of preventing inadvertent withdrawal of the output cable 7 along the radial direction.

The inner side of this cylindrical portion 22 is configured to be capable of surrounding an area of at least half the perimeter or more of the fixing portion 3 of the output cable 7 to which the curved band plate member 11a is fixedly caulked and a cable portion (the portion of the output cable 7 adjacent the curved band plate member 11a) 34 on the forward side of this fixed portion 33 along the cable insertion direction.

A caulking fixing portion 38 includes a rectangular hole 23 which allows insertion of the flat band plate member 15 from the lower face side of the bottom plate 3 with the output cable 7 to which the curved band plate member 11a is fixedly caulked being held to the holding portion 37.

Further, the caulking fixing portion 38 is provided with fixed portions 26 to which the flat band plate member 15 is to be fixedly caulked with opposed ends thereof being bent thereon.

Figure 22:
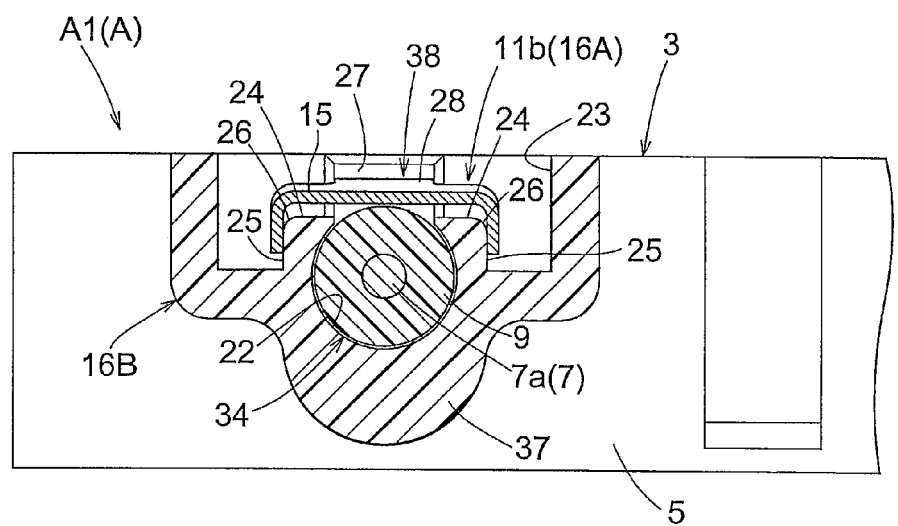
FIG. 22 is a section taken along a line XII-XII in FIG. 19.
Figure 23:
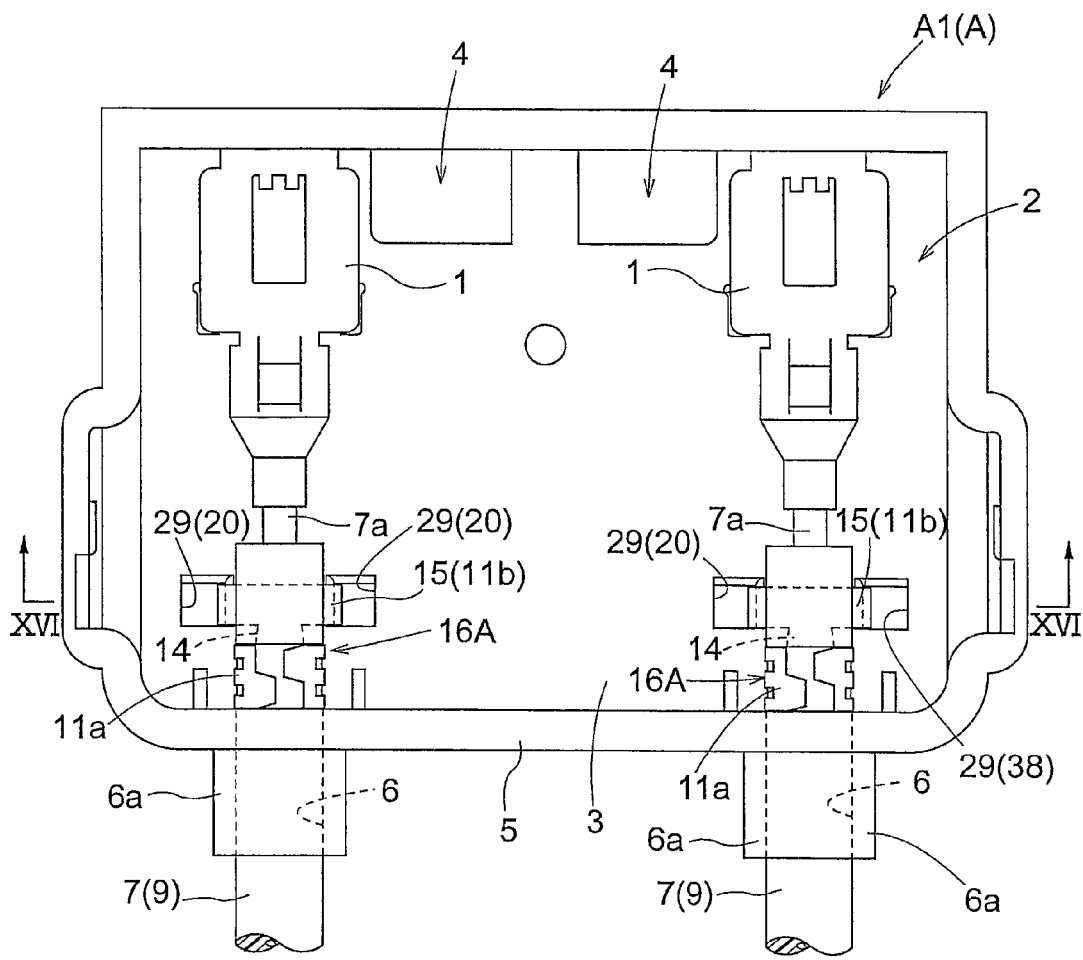
FIG. 23 is a plan view showing inside of a box body according to a second embodiment.
Figure 24:
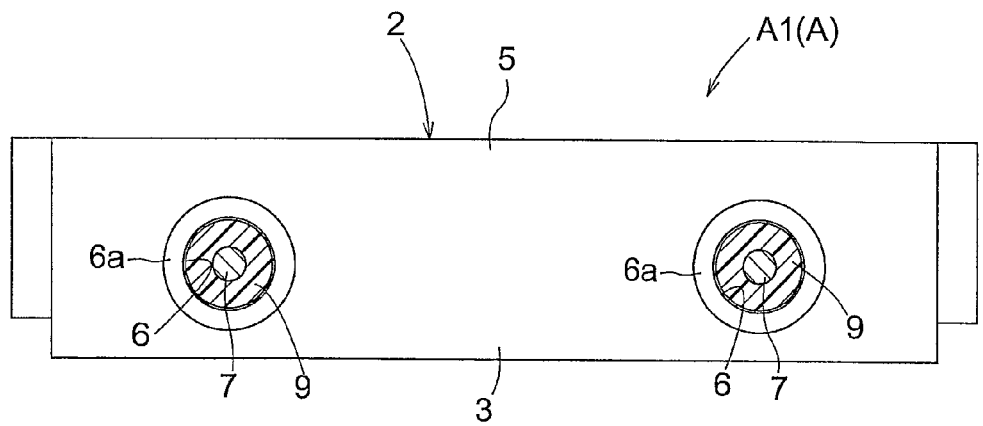
FIG. 24 is a front view of the box body according to the second embodiment.
Figure 25:
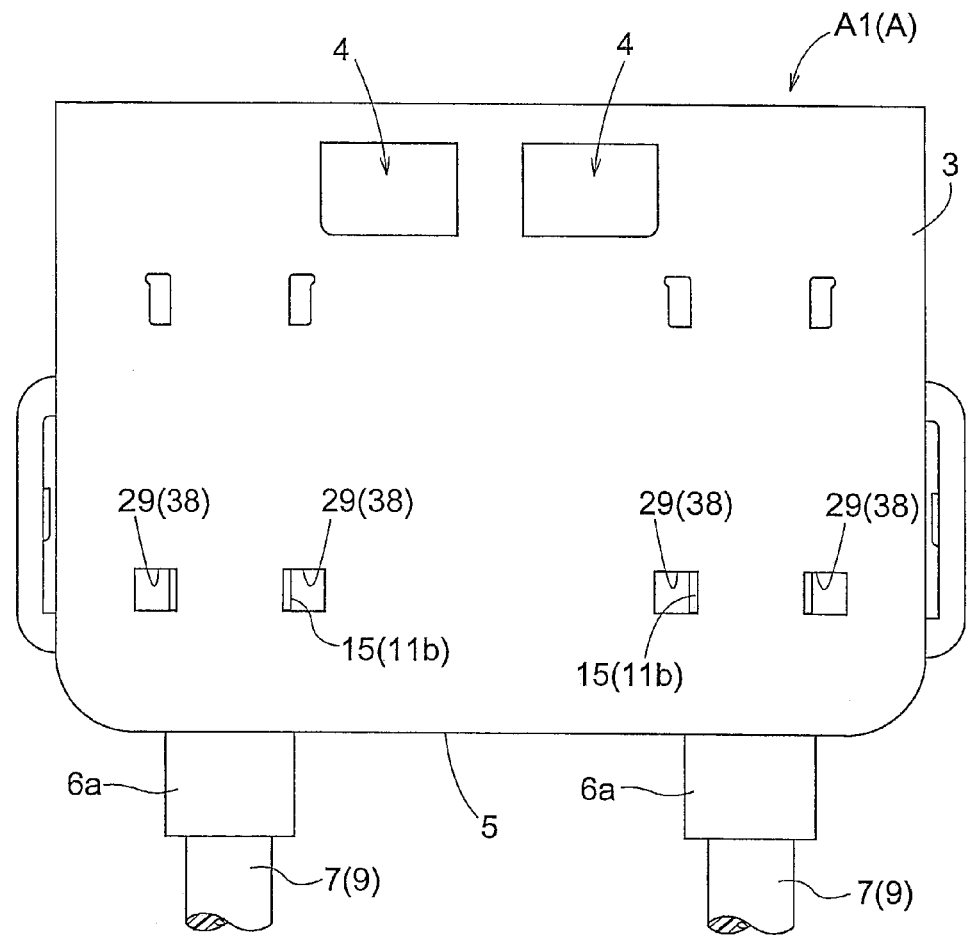
FIG. 25 is a plan view showing a bottom face of the box body according to the second embodiment.
Figure 26:
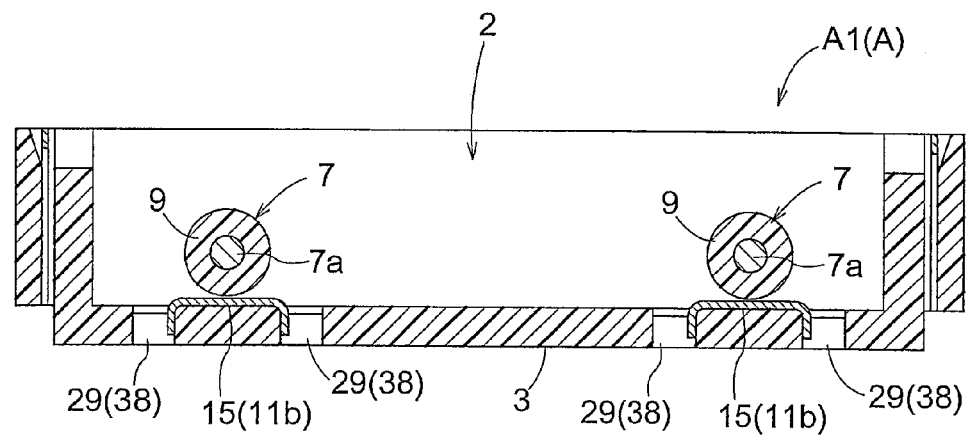
FIG. 26 is a section taken along a line XVI-XVI in FIG. 23.

As shown in FIG. 22, the fixed portions 26 are provided on the opposed sides across a slit 21, as corner portions 26, including, at a portion of the cylindrical portion 22 facing the rectangular hole 23, upper face portions 24 extending parallel with the lower face of the bottom portion 3 and side face portions 25 extending along the direction perpendicular to the upper face portions 24 and along the direction perpendicular to the side wall 5.

Then, as the connecting plate member 14 is plastically deformed to insert the flat band plate member 15 into the rectangular hole 23 and the opposed ends of this flat band plate member 15 are bent along side face portions 25 of the respective corner portions (fixed portions) 26, the flat band plate member 15 is fixed by caulking.

In the cable fastener 16A of this embodiment, the flat band plate member 15 include a pawl 28 which enters the recess 27 defined in the lower face of the bottom 3 in association with caulking fixation of the flat band plate member 15 to the caulking fixing portion 38. Therefore, when it is desired to release the calking fixation of the flat band plate member 15 to the caulking fixing portion 38, this can be released easily by raising this pawl 28 from the recess 27 by means of e.g. a driver.

Second Embodiment

FIGS. 23 through 26 show a further embodiment of the output cable fixation arrangement according to the present invention.

In this embodiment, the box body A1 includes, on the outer side of the box, bosses 6a to communicate to the cable insertion portions 6 formed in the side wall 5. The bottom plate 3 forms a pair of rectangular through holes 29 for introducing bent opposed ends of the flat band plate members 15 of the second fixing portions 11b. And, the bottom plate 3 further includes caulking fixing portions 38 for fixedly caulking the flat band plate members 15 to the bottom plate 3.

Incidentally, in this embodiment, there is employed a cable fastener 16A having no pawl 28 in the flat band plate member 15.

And, the output cable 7 before caulking fixation of the curved band plate member (first fixing portion) 11a of the cable fastener 16A thereto is inserted to the inside of the box body A1 through the boss 6a and the cable insertion portion 6 from the outside of the box body A1. Then, after the curved band plate member 11a of the cable fastener 16A to the output cable 7, the flat band plate member 15 is fixedly caulked to the bottom plate 3.

Incidentally, the output cable 7 to which the curved band plate member (first fixing portion) 11a of the cable fastener 16A is fixedly caulked in advance is drawn from the inside of the box body A1 through the cable insertion portion 6 and the boss 6a to the outside of the box body A1. Thereafter, the calking fixation to the bottom plate 3 may be effected alternatively by bending the opposed ends of the flat band plate member 15 of the cable fastener 16A toward the inside the rectangular through hole 29.

The rest of the construction of this embodiment is same as that of the first embodiment.

Meanwhile, although reference marks and numerals were provided in the foregoing discussion in order to facilitate reference to the accompanying drawings, it is understood that the provision thereof is not to limit the present invention to the constructions shown in the drawings. Further, the present invention may be embodied with various modifications thereof within the essential concept thereof as a matter of course.

INDUSTRIAL APPLICABILITY

The terminal box of the present invention may be employed as a terminal box including a box body attachable to an attachment target, a plurality of terminal plates juxtaposed under a mutually isolated state inside the box body, and a diode conductively connected to and between adjacent terminal plates.

Further, the output cable connection arrangement of the present invention may be used as an output cable connection arrangement for a solar cell module terminal box for electrically connecting an output cable to a terminal plate provided inside the terminal box to be electrically connected to a solar cell module through a cable insertion portion provided in the terminal box from the outside of the terminal box.

Furthermore, the output cable fixation arrangement of the present invention may be used as an output cable fixation arrangement for a solar cell module terminal box wherein a terminal plate to be electrically connected to a solar cell module is provided inside a terminal box and an output cable electrically connected to the terminal plate is extended to the outside of the terminal box.

DESCRIPTION OF REFERENCE MARKS/NUMERALS

A terminal box
A1 box body
1 terminal plate
6 cable insertion portion
6b annular recess
7 output cable
7a core wire
8 fixed attachment portion
9 barrel portion (insulating coating layer)
9a inner coating portion
91 leading end portion
91a outer peripheral face
91b end face
9b outer coating portion
10 waterproof portion
10c outer surface
10d inner surface
11a first fixing portion
11b second fixing portion
12 linear projection
16A cable fastener
18 bypass diode
19 lead terminal portion
20 sealing member
30 terminal plate body
31 bridge portion (corresponding to a "displacement-allowing connecting portion").
31a bent portion
33 portion where the first fixing portion is fixed
34 portion of the output cable adjacent the first fixing portion
37 cable holding portion

The invention claimed is:
1. A terminal box comprising:
a box body attachable to an attachment target;
a plurality of terminal plates juxtaposed under a mutually isolated state inside the box body; and a diode conductively connected to and between adjacent terminal plates;

wherein each one of said terminal plates includes a terminal plate body and a fixed attachment portion to which at least one lead terminal portion of said diode is fixed, and said fixed attachment portion is connected to said terminal plate body via a displacement-allowing connecting portion that can be displaced relative to said terminal plate body.

2. The terminal box according to claim 1, wherein said terminal plate is formed of a metal plate, and said displacement-allowing connecting portion is formed of a bridge portion having a smaller width than the terminal plate body and the fixed attachment portion.

3. The terminal box according to claim 2, wherein said bridge portion includes a curved portion which is bent in the thickness direction.

4. An output cable connection arrangement for a solar cell module terminal box for electrically connecting an output cable to a terminal plate provided inside the terminal box to be electrically connected to a solar cell module through a cable insertion portion provided in the terminal box from the outside of the terminal box, wherein said output cable includes a core wire, an inner coating portion coating the core wire of said output cable and an outer coating portion coating said inner coating portion to allow a leading end of the inner coating portion to be exposed, and a waterproof portion which covers an outer peripheral face and an end face of the leading end of the inner coating portion in the vicinity of the outer coating portion, and wherein said output cable is inserted into said cable insertion portion such that said waterproof portion and the outer coating portion adjacent said waterproof portion are engaged within said cable insertion portion.

5. The output cable connection arrangement for a solar cell module terminal box according to claim 4, wherein an annular sealing member is provided on at least one of an outer surface and an inner surface of said waterproof portion.

6. The output cable connection arrangement for a solar cell module terminal box according to claim 5, wherein said cable insertion portion forms an annular recess corresponding to the sealing member provided on the outer surface of said waterproof portion.

7. An output cable fixation arrangement for a solar cell module terminal box wherein a terminal plate to be electrically connected to a solar cell module is provided inside a terminal box and an output cable electrically connected to the terminal plate is extended to the outside of the terminal box, wherein a cable fastener is spaced apart from said terminal box to fix the output cable to the terminal box, and wherein said cable fastener has a first fixing portion to be fixed to a barrel portion of the output cable and a second fixing portion to be fixed to a portion of the terminal box.

8. The output cable fixation arrangement for a solar cell module terminal box according to claim 7, wherein said first fixing portion is formed like a band portion that can be wound and held around said barrel portion and said second fixing portion is formed as a T-like projection from said first fixing portion to be wound and held about the terminal box.

9. The output cable fixation arrangement for a solar cell module terminal box according to claim 7, wherein said first fixing portion forms a linear projection capable of applying a concentrated load to the outer face of said barrel portion.

10. The output cable fixation arrangement for a solar cell module terminal box according to claim 7, wherein said terminal box forms a cable holding portion capable of allowing insertion of said second fixing portion of the output cable to which said cable fastener is attached and capable also of holding or surrounding an area extending at least, half a perimeter of the portion to which said first fixing portion is fixed or adjacent said first fixing portion.

* * * * *

UNITED STATES PATENT AND TRADEMARK OFFICE
CERTIFICATE OF CORRECTION

PATENT NO. : 8,854,825 B2  Page 1 of 1
APPLICATION NO. : 13/239690
DATED : October 7, 2014
INVENTOR(S) : Masakazu Yamazaki It is certified that error appears in the above-identified patent and that said Letters Patent is hereby corrected as shown below:

In the Claims

Column 18, Line 34, Claim 10, delete "least," and insert -- least --

Signed and Sealed this
Tenth Day of February, 2015

Michelle K. Lee
*Deputy Director of the United States Patent and Trademark Office*